No. 811,352. PATENTED JAN. 30, 1906.
R. E. WYNN.
SELF GOVERNING CLUTCH.
APPLICATION FILED JUNE 22, 1905.
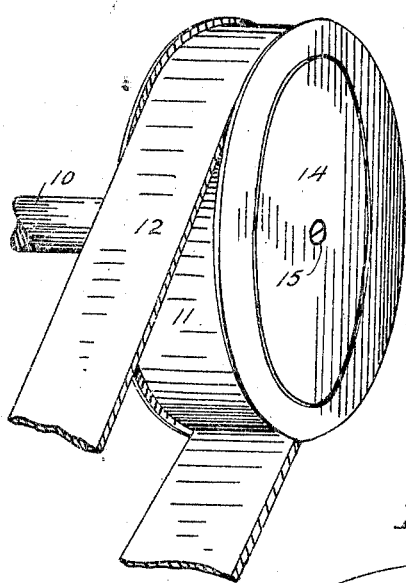
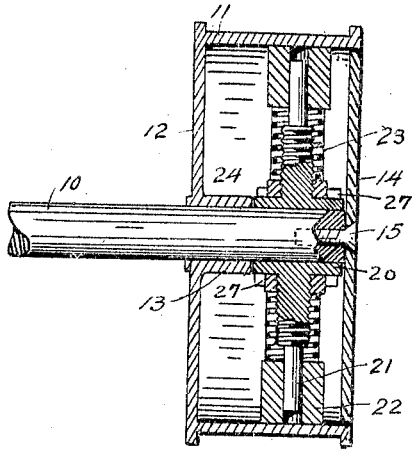
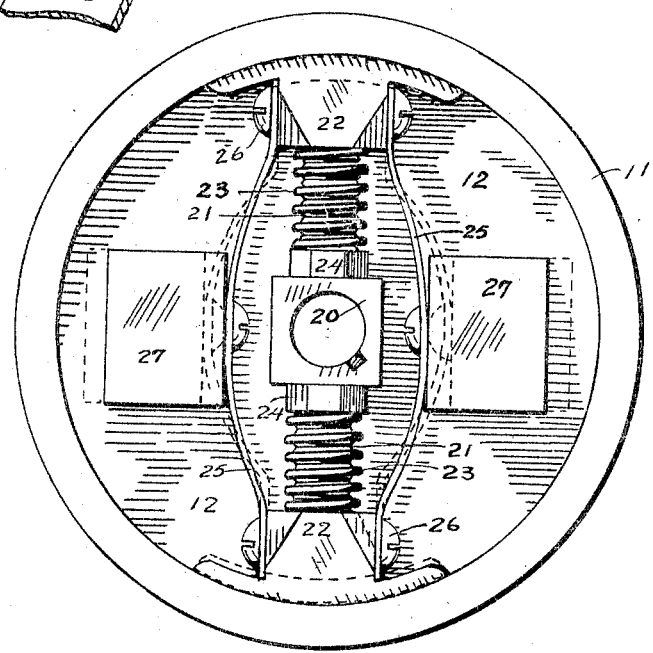
Witness
C. G. Hoen.
N. Allemong.
Inventor
Robert E. Wynn
By Lockwood
Attorney

UNITED STATES PATENT OFFICE.

ROBERT E. WYNN, OF INDIANAPOLIS, INDIANA, ASSIGNOR TO HENRICKS NOVELTY COMPANY, OF INDIANAPOLIS, INDIANA, A CORPORATION OF INDIANA.

SELF-GOVERNING CLUTCH.

No. 811,352.  Specification of Letters Patent.  Patented Jan. 30, 1906.

Application filed June 22, 1905. Serial No. 266,443.

*To all whom it may concern:*

Be it known that I, ROBERT E. WYNN, of Indianapolis, county of Marion, and State of Indiana, have invented a certain new and useful Self-Governing Clutch; and I do hereby declare that the following is a full, clear, and exact description thereof, reference being had to the accompanying drawings, in which like figures refer to like parts.

The object of this invention is to provide a compact, simple, and effective self-governing clutch for use in connection with a shaft and pulley.

The chief feature of the invention consists in mounting on a shaft two oppositely-positioned clutch-shoes adapted to engage the inner periphery of a pulley under the action of springs and centrifugal force, and combining therewith weights and springs connecting the weights with said clutch-shoes, so that under high speed said weights will reduce the pressure of the clutch-shoes against the pulley. In this arrangement the clutch-shoes and governing-weights revolve in a common plane through them, so that the centrifugal force acts on both the clutch-shoes and weights; but the weights are large enough under high speed to overcome the action of the springs and centrifugal force which tend to hold the shoes in engagement with the pulley. This and the other features of invention will be understood from the accompanying drawings and the following description and claims.

In the drawings, Figure 1 is a perspective view of the pulley mounted on a shaft, the shaft and belt being partly broken away. Fig. 2 is a central vertical section through the pulley, governor, and shaft. Fig. 3 is an end elevation of the pulley and governor, with the cover removed and showing by dotted lines the position of the governor during high speed.

The drawings herein show a shaft 10, that is driven from a pulley 11, and the pulley is driven by a belt 12. I do not wish to be limited to the use of a belt or pulley driven by a belt, as the pulley may be otherwise driven. In fact, I do not wish to be limited to the particular driving and driven members herein, as the invention may be used in connection with any driving and driven members.

The pulley is in the nature of a cylinder with one side closed and having a hub 13, that is mounted loosely on the shaft 10. A cover 14 is secured by the screw 15 to the end of the shaft 10, said cover closing the other side of the pulley, so that the governor is inclosed within the pulley and cover, whereby it is protected from dirt and other interfering things. The cover 14 rotates with the shaft. This closed form of pulley, however, is not necessary to the action of the governor.

The governor consists of a square sleeve 20, secured on the shaft within the pulley by a key or otherwise and having extending from it in two opposite directions the rods 21, which at their outer ends are reduced to enter loosely round holes through the clutch-shoes 22. Between the clutch-shoes and the square sleeve 20 there are spiral springs 23 and jam-nuts 24. Therefore said springs tend to force the clutch-shoes outward against the inner periphery of the pulley. Centrifugal force has also the same effect on the clutch-shoes—namely, to tend to maintain frictional engagement between the shoes and the pulley—whereby power will be transmitted from the pulley to the shaft, or the reverse. A pair of flat springs 25 are secured at each end to the side of the opposing clutch-shoes by screws 26. Weights 27 are secured to the bow-springs in the middle and on the side opposite the shaft, so that high speed will cause said weights 27 to move outward toward the pulley into the dotted-line position, (shown in Fig. 3,) which will spread the springs 25 and draw the clutch-shoes toward each other against the action of the springs 23 and the centrifugal force acting on the brake-shoes, and thus reduce the pressure of the brake-shoes against the pulley, whereupon reduced speed of the shaft results. To do this, the weight 27 should be heavier than the brake-shoes, so their centrifugal force will overcome that of the shoes and also the action of the springs. Instead of the springs 25 the governor-weights may be otherwise connected with the clutch-shoes by any yielding or flexible means. Therefore in this particular construction the springs 23 and 25 coact in low speed, but in high speed they act against each other, and the centrifugal force of the clutch-shoes acts against the centrifugal force of the weights 27; but in high speed the weights overcome the clutch-shoes. This makes an externally-sensitive governor. Its action can be adjusted by the jam-nuts 24 changing the action of springs 23. Also the entire governor is very compact and mounted within the pulley and can be covered and protected by the cover on the side of the pulley.

What I claim as my invention, and desire to secure by Letters Patent, is—

1. The combination with a pulley and a shaft, of a self-governing clutch for transmitting power from one to the other consisting of oppositely-extending stems carried by the shaft, spring-actuated clutch-shoes slidably mounted on the stems and in engagement with the pulley, yielding means connecting said clutch-shoes, and weights secured to said yielding means so that the weights under high speed will reduce the pressure of the clutch-shoes against the pulley.

2. The combination with a driving-pulley and a driven shaft of oppositely-extending governor-stems secured to the shaft, brake-shoes slidably mounted on said stems, springs tending to push said brake-shoes into engagement with the pulley, a pair of bow-springs, one on each side of the shaft, that connect said brake-shoes, and a weight secured to the middle of each bow-spring revolving in a common plane.

3. The combination with a shaft of a pulley consisting of a rim, a hub loosely mounted on the shaft and nearer than the rim, a side plate secured to the rim and hub, a plate secured to the end of the shaft and closing the opening, and a self-governing clutch mounted on said shaft and within said pulley.

In witness whereof I have hereunto affixed my signature in the presence of the witnesses herein named.

ROBERT E. WYNN.

Witnesses:
V. H. LOCKWOOD.
N. ALLEMONG.